(12) United States Patent
Hasui

(10) Patent No.: US 10,649,516 B2
(45) Date of Patent: May 12, 2020

(54) INFORMATION PROCESSING APPARATUS, CONTROL METHOD FOR THE SAME AND STORAGE MEDIUM

(71) Applicant: CANON KABUSHIKI KAISHA, Tokyo (JP)

(72) Inventor: Shigeki Hasui, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 121 days.

(21) Appl. No.: 15/477,185

(22) Filed: Apr. 3, 2017

(65) Prior Publication Data

US 2017/0205867 A1 Jul. 20, 2017

Related U.S. Application Data

(63) Continuation of application No. 14/537,047, filed on Nov. 10, 2014, now abandoned.

(30) Foreign Application Priority Data

Nov. 13, 2013 (JP) .................................. 2013-234847

(51) Int. Cl.
*G06F 1/32* (2019.01)
*H04L 12/12* (2006.01)
(Continued)

(52) U.S. Cl.
CPC ............ *G06F 1/3203* (2013.01); *G06F 1/266* (2013.01); *G06F 1/32* (2013.01); *G06F 1/3209* (2013.01);
(Continued)

(58) Field of Classification Search
None
See application file for complete search history.

(56) References Cited

U.S. PATENT DOCUMENTS 8,345,291 B2    1/2013  Hosogoshi
8,874,944 B2 *  10/2014  Kamijima ............ G06F 1/3203
                                                    713/320
(Continued)

FOREIGN PATENT DOCUMENTS

CN       101888400 A    11/2010
CN       102638635 A     8/2012
JP       2011082922 A    4/2011

OTHER PUBLICATIONS

Office Action issued in Chinese Appln. No. 201410640260.5 dated Mar. 22, 2017. English translation provided.
(Continued)

*Primary Examiner* — Tanh Q Nguyen
(74) *Attorney, Agent, or Firm* — Rossi, Kimms & McDowell LLP

(57) ABSTRACT

An information processing apparatus that can avoid an IEEE802.1X re-authentication process due to a communication speed setting change made at the time of transitioning to the power-saving state and realize both of security and power-saving. Fixed link speed with which both a MFP 100 and a communication apparatuses are compatible is set on the basis of acquired pieces of link speed setting information about the MFP 100 and the communication apparatus. Then, 100 Mbps lower than 1000 Mbps is fixedly set on the basis of acquired power-saving setting information about the MFP 100 when the power-saving setting is effective, and EEE is enabled.

5 Claims, 10 Drawing Sheets

| | LINK SPEED SETTING | NORMAL POWER STATE LINK SPEED | POWER-SAVING STATE LINK SPEED | COMPATIBILITY WITH EEE |
|---|---|---|---|---|
| 501 | AUTOMATIC SPEED | 1000 / 100 / 10 Mbps | 10 Mbps | COMPATIBLE ( 1000 / 100Mbps ) |
| 502 | 1000 Mbps FIXED | 1000 Mbps | 1000 Mbps | COMPATIBLE |
| 503 | 100 Mbps FIXED | 100 Mbps | 100 Mbps | COMPATIBLE |
| 504 | 10 Mbps FIXED | 10 Mbps | 10 Mbps | INCOMPATIBLE |

500

(51) Int. Cl.
*G06F 1/3203* (2019.01)
*H04L 29/06* (2006.01)
*H04L 12/10* (2006.01)
*G06F 1/3293* (2019.01)
*G06F 1/3287* (2019.01)
*G06F 1/3209* (2019.01)
*G06F 1/3234* (2019.01)
*G06F 1/26* (2006.01)
*G06F 3/12* (2006.01)
*G06F 21/81* (2013.01)
*H04L 12/24* (2006.01)
*H04N 1/00* (2006.01)

(52) U.S. Cl.
CPC .......... *G06F 1/3284* (2013.01); *G06F 1/3287* (2013.01); *G06F 1/3293* (2013.01); *G06F 3/1221* (2013.01); *G06F 21/81* (2013.01); *H04L 12/10* (2013.01); *H04L 12/12* (2013.01); *H04L 41/0833* (2013.01); *H04L 63/00* (2013.01); *H04L 63/08* (2013.01); *H04N 1/00217* (2013.01); *H04N 1/00244* (2013.01); *Y02D 10/122* (2018.01); *Y02D 10/171* (2018.01)

(56) References Cited

U.S. PATENT DOCUMENTS

| | | |
|---|---|---|
| 8,977,877 B2 | 3/2015 | Yamada et al. |
| 9,100,527 B2 | 8/2015 | Shouno |
| 2007/0240004 A1 | 10/2007 | Maeda |
| 2007/0240213 A1* | 10/2007 | Karam .................. H04L 12/40 726/22 |
| 2010/0251342 A1 | 9/2010 | Uchikawa |
| 2015/0134986 A1 | 5/2015 | Hasui |
| 2017/0205867 A1* | 7/2017 | Hasui .................. G06F 1/3209 |

OTHER PUBLICATIONS

Office Action issued in U.S. Appl. No. 14/537,047 dated Sep. 8, 2016.

* cited by examiner

| | LINK SPEED SETTING | NORMAL POWER STATE LINK SPEED | POWER-SAVING STATE LINK SPEED | COMPATIBILITY WITH EEE |
|---|---|---|---|---|
| 501 | AUTOMATIC SPEED | 1000 / 100 / 10 Mbps | 10 Mbps | COMPATIBLE (1000 / 100Mbps) |
| 502 | 1000 Mbps FIXED | 1000 Mbps | 1000 Mbps | COMPATIBLE |
| 503 | 100 Mbps FIXED | 100 Mbps | 100 Mbps | COMPATIBLE |
| 504 | 10 Mbps FIXED | 10 Mbps | 10 Mbps | INCOMPATIBLE |

FIG. 6

| COUNTER APPARATUS LINK SPEED SETTING | COMPATIBILITY WITH EEE |
|---|---|
| AUTOMATIC SPEED | COMPATIBLE |
| 1000 Mbps FIXED | COMPATIBLE |
| 100 Mbps FIXED | COMPATIBLE |
| 10 Mbps FIXED | INCOMPATIBLE |

FIG. 7

| POWER-SAVING SETTING | SETTING |
|---|---|
| HIGH POWER CONSUMPTION | -- |
| LOW POWER CONSUMPTION | ○ |

FIG. 10A

NETWORK SETTING (802.1X AUTHENTICATION)  1000

| TOP | 802.1X AUTHENTICATION SETTING |
| CONFIGURATION | AUTHENTICATION MODE |

802.1X AUTHENTICATION IS TO BE ENABLED.
CURRENT NETWORK SPEED IS SET TO AUTOMATIC SPEED SETTING.
NETWORK SPEED SETTING IS TO BE CHANGED TO 100 Mbps-EEE.   — 1010

[CONFIRM]   — 1011

[RETURN]

FIG. 10B   1020

802.1X AUTHENTICATION IS TO BE ENABLED.
CURRENT NETWORK SPEED IS SET
TO AUTOMATIC SPEED SETTING.
NETWORK SPEED SETTING IS TO BE CHANGED TO
100 M-EEE.
OK?

[YES]   — 1021
[NO]   — 1022

FIG. 10C   1030

802.1X AUTHENTICATION IS TO BE ENABLED.
SELECT NETWORK SPEED.

CURRENT NETWORK SPEED : AUTOMATIC SPEED SETTING

SELECTABLE NETWORK SPEEDS

- 1000M-EEE ☐
- 100M-EEE ☑
- 1000M ☐
- 100M ☐

[CONFIRM]

INFORMATION PROCESSING APPARATUS, CONTROL METHOD FOR THE SAME AND STORAGE MEDIUM

BACKGROUND OF THE INVENTION

Field of the Invention

The present invention relates to an information processing apparatus, a control method therefor and a storage medium, and more particularly, to an information processing apparatus capable of connecting to a network in a power-saving state.

Description of the Related Art

Recently, while network environments in offices are being improved, information processing apparatuses, such as a complex machine provided with a network connection function (a multi-function printer), have spread rapidly, and apparatus coordination with a personal computer, a server and the like via a network is performed. In network environments in offices, secure network connection is indispensable from the perspective of information leakage and security protection. As a security technique therefor, IEEE802.1X defined by IEEE (Institute of Electrical and Electronic Engineers) exists. In IEEE802.1X, by registering apparatuses which can connect to a network with an authentication server in advance, detecting connection by an apparatus to a LAN (Local Area Network) port, and performing an authentication process, participation of an unregistered apparatus in the network can be prevented.

Meanwhile, with increase in interest in environment, there is a great demand for realization of a power-saving technique for reducing power consumption of all information apparatuses used in an office or the like. As a power-saving technique for an information processing apparatus such as a complex machine, there is known a technique of detecting that an apparatus has not been operated for a predetermined time in a normal power state and transitioning to a power-saving state by an autonomous operation to reduce power during standby time.

There is also known a technique of providing a sub-control section which is smaller sized than a main control section and which operates with minimum power supply in a power-saving state, and, realizing both of network connectivity and power-saving by, in the power-saving state, cutting off power to the main control section and causing the sub-control section to perform network processing as proxy for the main control section.

Furthermore, there is known a technique which realizes further power-saving by, at the time of transitioning to a power-saving state, changing setting of communication speed to a communication apparatus to lower speed than the time of a normal power state. For example, when the communication speed is set to automatic speed setting (auto-negotiation) in the normal power state, connection to the communication apparatus is established with 1000 Mbps (Mega bit per second). However, in transition to the power-saving state, the communication speed is set to 10 Mbps. Thereby, it is possible to, in the power-saving state, cause a control circuit of a physical layer related to network connection to be in a non-operating state according to the lower communication speed, and it is possible to realize reduction of power consumption corresponding thereto and realize power-saving.

Here, in the case of using IEEE802.1X authentication in an information processing apparatus which realizes power-saving by changing the communication speed setting to lower speed at the time of transitioning to the power-saving state, an IEEE802.1X re-authentication process occurs due to link disconnection and reconnection accompanying the communication speed setting change at the time of transitioning to the power-saving state. The IEEE802.1X authentication process generally requires a high-load negotiation process with an authentication server, and it is difficult for the sub-control section with in sufficient functions to cope therewith. Therefore, the information processing apparatus is required to transition from the power-saving state to the normal power state and perform the authentication process by the main control section. Though security is maintained, it is not possible to transition to the power-saving state, and power-saving cannot be realized.

In order to realize the power-saving state even when network security authentication is used in such an information processing apparatus, a technique is disclosed in which it is possible to transition to the power-saving state without performing an authentication process by the sub-control section. For example, in a technique disclosed in Japanese Laid-Open Patent Publication (Kokai) No. 2011-82922, when the communication state is a non-authentication state in a predetermined communication standard, in the case of switching from the normal power state to the power-saving state, a power supply unit is controlled so that the communication state becomes a communication state enabling authentication, and an authentication process is performed. Furthermore, if the authentication process is successful, the power supply unit is controlled so that power supply to power-saving target parts is cut off to transition to the power-saving state. Then, it is detected that IEEE802.1X authentication is caused to be in a non-authentication state by changing the communication speed setting to lower speed in response to transition to the power-saving state. Then, after the main control section performs a re-authentication process in a state that the communication setting is still changed to the lower speed, power to the main control section is cut off without changing the communication speed setting to transition to the power-saving state. Thereby, both of security and power-saving are realized.

However, in the case of applying the technique disclosed in Japanese Laid-Open Patent Publication (Kokai) No. 2011-82922 to the information processing apparatus which realizes power-saving by changing the communication speed setting to communication speed setting lower than the normal power state at the time of transitioning to the power-saving state, a problem shown below occurs.

In the technique disclosed in Japanese Laid-Open Patent Publication (Kokai) No. 2011-82922, the IEEE802.1X re-authentication process occurs in a state that the communication speed setting is still changed to the lower speed. As described above, in the IEEE802.1X authentication process, it is necessary to perform a high-load negotiation process with an authentication server, and the amount of data to be processed is large. Therefore, when the re-authentication process is performed under the low communication speed setting, data communication time accompanying the negotiation process performed with the authentication server increases in comparison with the normal power state. For example, when the communication speed setting of 1000 Mbps as automatic speed setting in the normal power state is changed to the communication speed setting of 10 Mbps in the power-saving state, the theoretical communication band of the power-saving state corresponds to one hundredth of that of the normal power state. Data communication time increases by an amount corresponding thereto, and a problem occurs that the information processing apparatus cannot immediately transition to the power-saving state, and power-saving cannot be quickly achieved. That is, the information processing apparatus is required to avoid the IEEE802.1X re-authentication process due to a communication speed setting change made at the time of transitioning to the power-saving state even when communication based on IEEE802.1X authentication is enabled.

SUMMARY OF THE INVENTION

The present invention provides a technique making it possible, even if communication based on IEEE802.1X authentication is enabled, to avoid an IEEE802.1X re-authentication process due to a communication speed setting change made at the time of transitioning to the power-saving state and realize both of security and power-saving.

Accordingly, an aspect of the present invention provides an information processing apparatus operating in a first power state or a second power state in which power supply is reduced lower than the first power state, and performing communication with a communication apparatus connected via a network in a predetermined communication mode, and the information processing apparatus comprises a judgment unit configured to judge whether setting of communication speed between the information processing apparatus and the communication apparatus is automatic speed setting or not, and a communication control unit configured to, if it is judged by the judgment unit that the setting of the communication speed is the automatic speed setting, set the communication speed to fixed communication speed with which network connection with the communication apparatus is not cut off at the time of transitioning from the first power state to the second power state.

According to the present invention, even if communication based on IEEE802.1X authentication is enabled, it is possible to avoid an IEEE802.1X re-authentication process due to a communication speed setting change made at the time of transitioning to the power-saving state and realize both of security and power-saving.

Further features of the present invention will become apparent from the following description of exemplary embodiments (with reference to the attached drawings).

BRIEF DESCRIPTION OF THE DRAWINGS

FIG. 6 is a diagram showing an example of link speed setting information about a communication apparatus acquired in step S403 in FIG. 4.

FIG. 7 is a diagram showing an example of power-saving setting information about the MFP acquired in step S404 in FIG. 4.

FIG. 10A is a diagram showing an example of a link speed setting changing screen displayed on an operation section.

FIG. 10B is a diagram showing an example of a pop-up display of a link speed setting changing notification on the link speed setting changing screen.

FIG. 10C is a diagram showing another example of the pop-up display of the link speed setting changing notification on the link speed setting changing screen.

DESCRIPTION OF THE EMBODIMENTS

An embodiment of the present invention will be described below in detail with reference to drawings.

Figure 1:
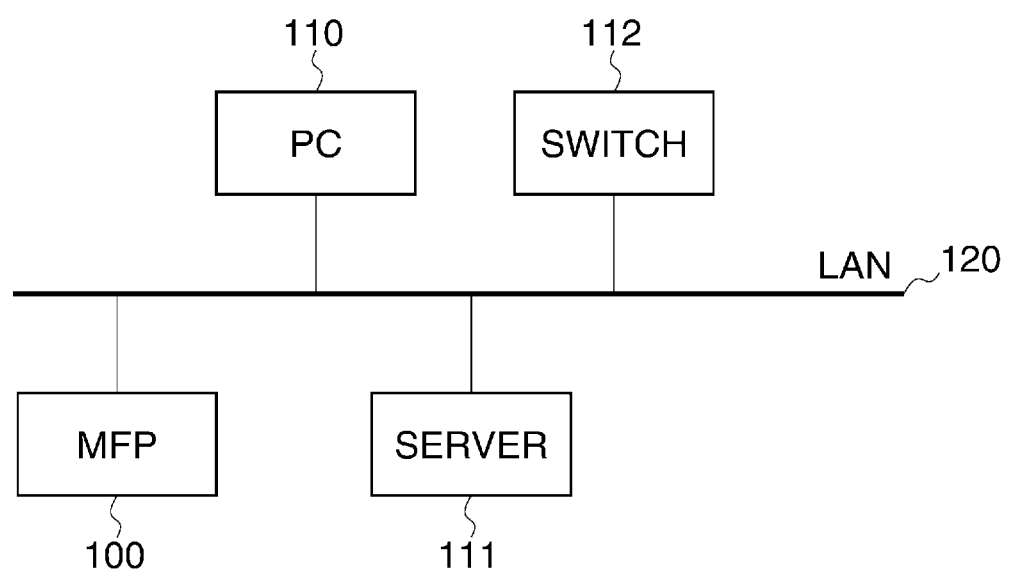
FIG. 1 is a block diagram showing an example of a network environment in which an information processing apparatus according to an embodiment of the present invention is arranged.

FIG. 1 is a block diagram showing an example of a network environment in which an information processing apparatus according to an embodiment of the present invention is arranged.

An MFP 100 is a complex machine (information processing apparatus) which performs input/output and transmission/reception of an image and various kinds of image processing related thereto. The MFP 100 is connected to a PC 110, a server 111, and a switch 112 (a communication apparatus) having a packet switching function via a LAN (Local Area Network) 120.

In the present embodiment, each apparatus connected to the LAN 120 performs communication based on an authentication process using IEEE802.1X. In IEEE802.1X, three components of a supplicant to be an authentication target, an authenticator which performs access control of a terminal on the basis of an authentication result and an authentication server (RADUIS server) which manages authentication information coordinate with one another to realize communication based on authentication. In the present embodiment, the MFP 100, the switch 112 and the server 111 play the roles of the supplicant, the authenticator and the authentication server (RADUIS server), respectively, to perform communication based on IEEE802.1X.

Next, a schematic configuration of the MFP 100 will be described.

Figure 2:
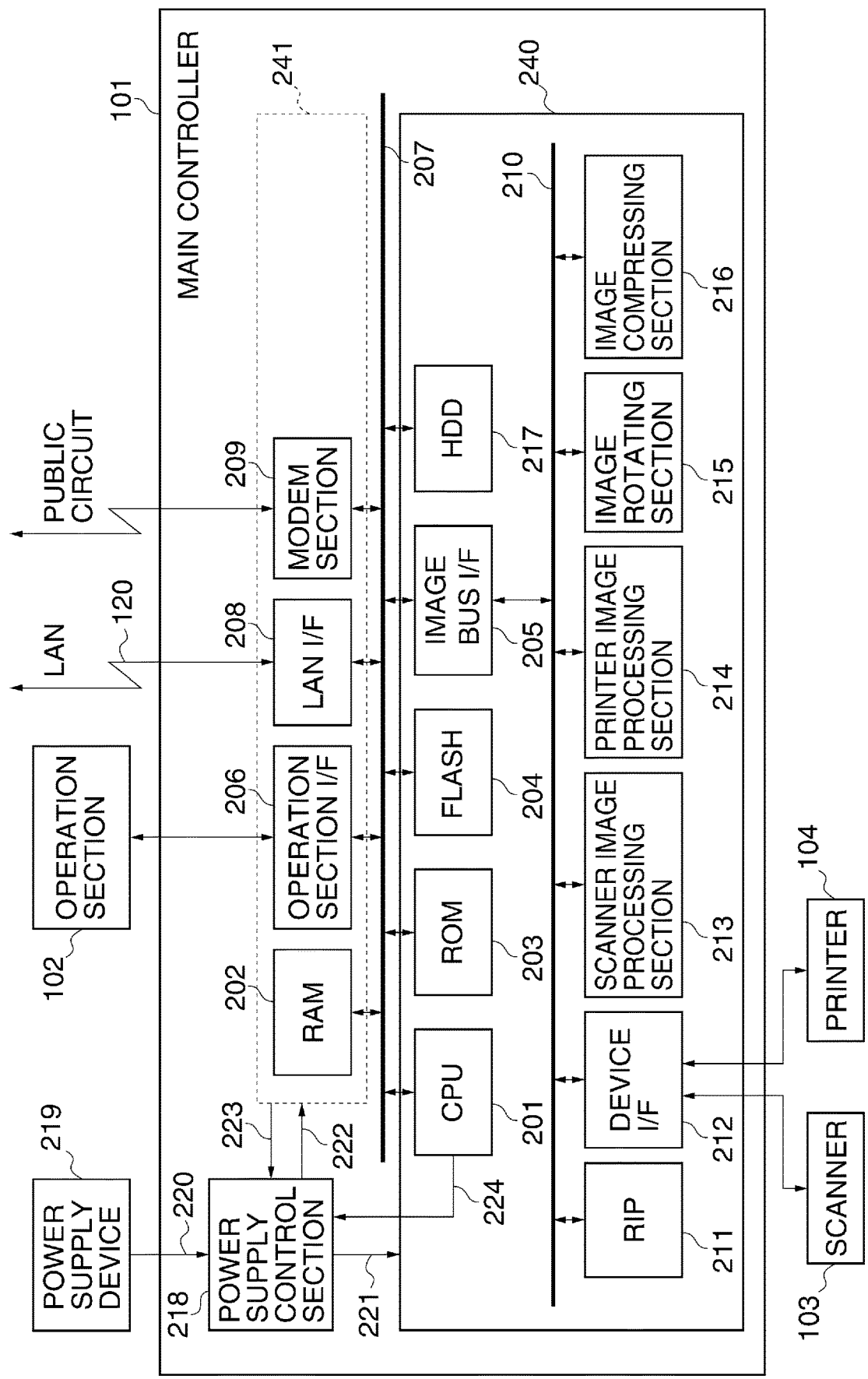
FIG. 2 is a block diagram showing a schematic configuration of an MFP in FIG. 1.

FIG. 2 is a block diagram showing a schematic configuration of the MFP 100 in FIG. 1.

The MFP 100 is provided with a main controller 101 which controls the whole apparatus, an operation section 102 which is a user interface, a scanner 103 which is an image input device and a printer 104 which is an image output device. Each of the operation section 102, the scanner 103 and the printer 104 is connected to the main controller 101, and the main controller 101 controls an operation of each component.

The main controller 101 controls the scanner 103 and the printer 104. The main controller 101 is also connected to the LAN 120 and a public circuit and performs input/output of image information, device information and other various kinds of information to/from an external apparatus via a LAN I/F 208 and a modem section 209. The MFP 100 in the present embodiment connects to the server 111 and the like on the LAN 120 via the switch 112 by the LAN I/F 208.

The main controller 101 is provided with a CPU (Central Processing Unit) 201 which performs main control. The CPU 201 is connected to a RAM (Random Access Memory) 202, a ROM (Read Only Memory) 203, a flash 204 and an image bus I/F 205 via a system bus 207. Furthermore, the CPU 201 is connected to an operation section I/F 206, the LAN I/F 208 and the modem section 209.

The RAM 202 is a memory for providing a work area of the CPU 201, where reading and writing can be performed occasionally. The RAM 202 is also used as an image memory for temporarily storing image data. The ROM 203 is a boot ROM, in which a boot program of the system is stored. The flash 204 is a nonvolatile memory, and system software, set value data and the like required to be maintained even after cutoff of power supply to the MFP 100 are stored therein.

The operation section I/F 206 is an interface for performing input/output between the operation section 102 and the operation section I/F 206, which is configured, for example, with a liquid crystal touch panel or the like. The operation section I/F 206 is used to output image data to be displayed, to the operation section 102 and to transmit information inputted by a user via the operation section 102 to the CPU 201.

The LAN I/F 208 is an interface for connecting to the LAN 120 and performs input/output of information to/from the LAN 120. Details of the LAN I/F 208 will be described later. The modem section 209 is an interface for connecting to the public circuit and performs input/output of information to/from the public circuit.

The image bus I/F 205 is an interface which connects the system bus 207 and an image bus 210, and operates as a bus bridge which converts a data structure.

A RIP (Raster Image Processor) 211, a device I/F 212, a scanner image processing section 213, a printer image processing section 214, an image rotating section 215 and an image compressing section 216 are connected to the image bus 210.

The RIP 211 develops PDL (Page Description Language) data received from the LAN 120 into a bitmap image. The device I/F 212 is an interface which connects the scanner 103 and the printer 104 to the main controller 101, and it performs synchronous/asynchronous conversion of image data.

The scanner image processing section 213 performs processes, such as correction, processing and editing, for input image data obtained by reading an image by the scanner 103. The printer image processing section 214 performs processes, such as color conversion, filter processing and resolution conversion, for print output image data to be outputted to the printer 104. The image rotating section 215 performs rotation of image data. The image compressing section 216 performs a JPEG compression/expansion process for multi-valued image data and performs a JBIG, MMR or MH compression/expansion process for binary image data.

An HDD (Hard Disk Drive) 217 is a volatile data storage device, in which various kinds of data, such as image data, system data and user data, and an operation program executed by the CPU 201 are stored. It is assumed that, if the main controller 101 is not provided with the HDD 217, the various kinds of data described above is held in the flash 204.

A power supply control section 218 supplies DC power received from a power supply device 219, which is a power supply unit, via a power supply line 220 to predetermined circuit elements of the main controller 101 via power supply lines 221 and 222. The power supply device 219 is provided with two-system power supply circuits: a large power supply circuit for large-capacity electric supply not shown, and a small power supply circuit for small-capacity electric supply not shown. The power supply control section 218 performs electric supply control while switching between the power supply circuits in accordance with a power state of the MFP 100 to be described later.

The power supply control section 218 also receives a control signal from a control signal line 223 from the operation section I/F 206, the LAN I/F 208 and the modem section 209 and a control signal line 224 from the CPU 201. Then, the power supply control section 218 performs power supply control of each of the power supply lines (221 and 222) on the basis of the received control signal.

The power supply line 221 is connected to the CPU 201, the ROM 203, the HDD 217 and the image bus I/F 205. Furthermore, the power supply line 221 is connected to the RIP 211, the device I/F 212, the scanner image processing section 213, the printer image processing section 214, the image rotating section 215 and the image compressing section 216. The power supply line 222 is connected to the RAM 202, the operation section I/F 206, the LAN I/F 208 and the modem section 209.

In the present embodiment, the MFP 100 is provided with two operation modes: a normal power state and a power-saving state.

In the normal power state (a first power state), the power supply device 219 supplies power to the power supply control section 218 via the power supply line 220. The CPU 201 controls the power supply control section 218 so that power supply to the power supply line 221 and the power supply line 222 is enabled. That is, in the normal power state, power is supplied to both of the CPU 201 and the LAN I/F 208 from the power supply device 219.

In the power-saving state (a second power state), the power supply device 219 supplies power to the power supply control section 218 via the power supply line 220. The CPU 201 controls the power supply control section 218 so that only the power supply line 222 supplies power, and the power supply line 221 does not supply power. Thereby, power supply to main circuit elements 240 the main controller 101 is provided with, including the CPU 201, is cut off. As a result, in the power-saving state, power consumption of the MFP 100 can be greatly reduced in comparison with the normal power state.

Furthermore, if the LAN I/F 208 receives data such as a printing job from the PC 110 or the like on the LAN 120, the LAN I/F 208 can control the power supply control section 218 to return from the power-saving state to the normal power state. It should be noted that, in the present embodiment, the return from the power-saving state to the normal power state is caused not only by data reception by the wired LAN I/F 208. The return can be also caused by FAX reception by the modem section 209 or by pressing of a button provided on the operation section 102, which is not shown.

In the power-saving state, the power supply device 219 supplies only minimum power to the RAM 202, and the RAM 202 backs up a system program by performing self-refresh operation. Thereby, it is possible to immediately develop the system program on the RAM 202 and perform operation return after returning from the power-saving state to the normal power state.

It should be noted that, though it is assumed that power supply to the CPU 201 is cut off in the power-saving state, this is not limiting. For example, as another aspect, a power state in which power supply to the CPU 201 is reduced lower than the normal power state may be regarded as the power-saving state. In this case, it is necessary to lower the operating frequency of the CPU 201 in the power-saving state in comparison with the normal power state, and the processing performance of the CPU 201 per unit time is reduced. Therefore, even in the case of having transitioned to the power-saving state in which power supply to the CPU 201 is not cut off but reduced, it is necessary to return to the normal power state and perform a packet response process similarly to the case in which power supply is cut, for example, if a situation occurs that it is impossible to respond by a processing operation in the power-saving state because of reception of a lot of packets.

Next, a configuration of the LAN I/F 208 the main controller 101 is provided with will be described in detail with the use of FIG. 3.

Figure 3:
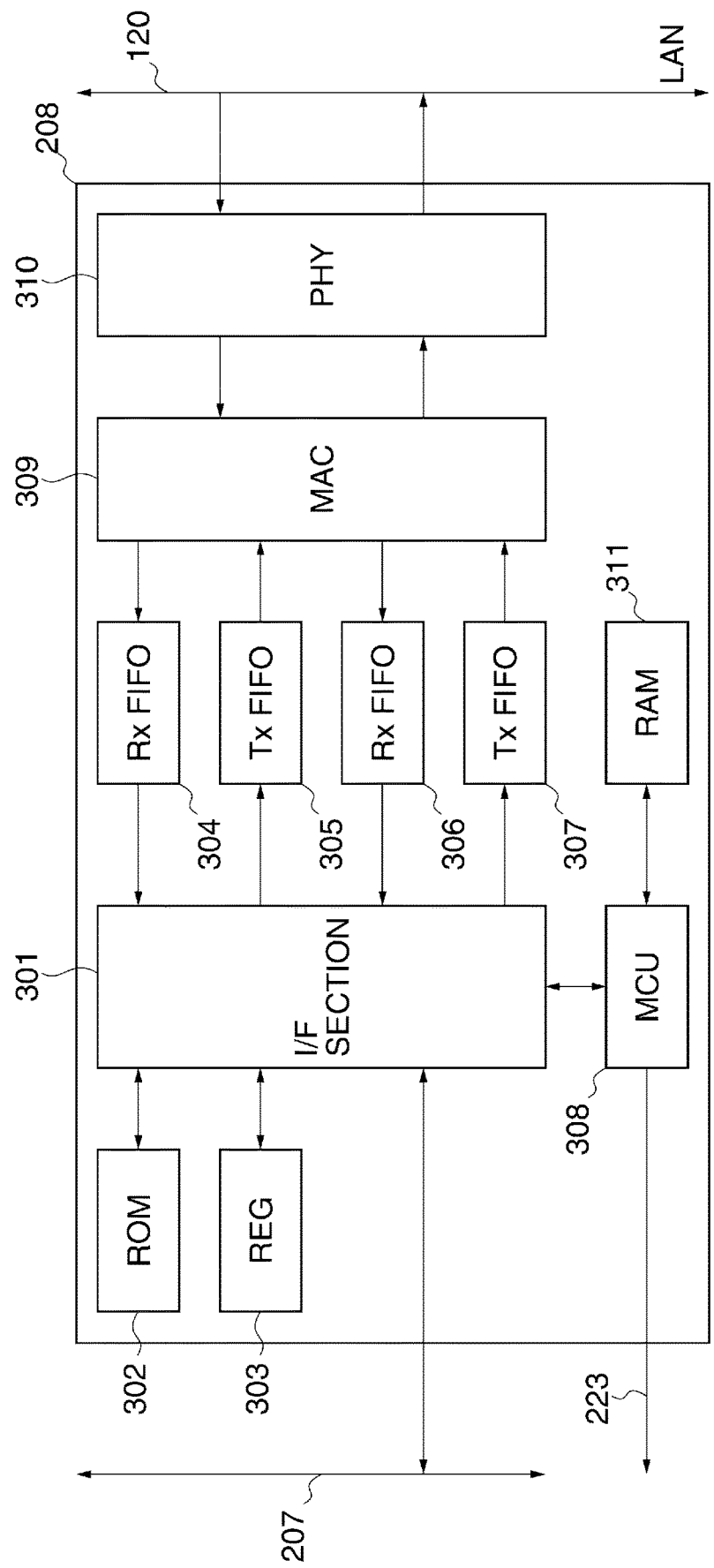
FIG. 3 is a block diagram showing a schematic configuration of a LAN I/F in FIG. 2.

FIG. 3 is a block diagram showing a schematic configuration of the LAN I/F 208 in FIG. 2.

In FIG. 3, a ROM 302 is a nonvolatile memory configured with a flash memory or the like. In the ROM 302, firmware and the like required for an operation of an MCU (Micro Control Unit) 308, which have been received from the main controller 101 via an I/F section 301, are stored.

A REG 303 is a register group in which operation setting information and status information about the LAN I/F 208 are stored. The MCU 308 performs register setting for the REG 303 and refers to a status of the REG 303 via the I/F section 301.

A RAM 311 is a shared local memory in the LAN I/F 208. The capacity of the RAM 311 is smaller in comparison with the RAM 202, and the RAM 311 can store minimum necessary programs and various kinds of data used for a packet response process of the LAN I/F 208 with minimum power consumption.

The LAN I/F 208 performs various kinds of packet processing by the MCU 308 and the various kinds of circuit elements operating in coordination with one another on the basis of the firmware stored in the ROM 302 and register values set for the REG 303.

First, a packet receiving operation of the LAN I/F 208 in the normal power state will be described.

The MFP 100 receives data in a packet from the LAN 120 via a PHY 310. The PHY 310 performs protocol control of the physical layer of a network and converts an electrical signal received from the LAN 120 to a logic signal. The PHY 310 transfers the receive packet to a MAC (Media Access Control) 309. The MAC 309 detects a destination and transmission source of the data and a boundary between frames which represent transmission/reception units, from the logic signal received from the PHY 310. The MAC 309 transfers the receive packet to an Rx FIFO (First In First Out) 304 which is a receive buffer. Then, after being handed to the main controller 101 via the I/F section 301 connected to the system bus 207 and temporarily stored on the RAM 202, the receive packet is processed by the CPU 201 on the basis of a processing program developed on the RAM 202 in advance.

Next, a packet transmitting operation of the LAN I/F 208 in the normal power state will be described.

The packet transmitting operation is a process in reverse order of the packet receiving operation described above. On the basis of the processing program developed on the RAM 202 in advance, the CPU 201 transfers a transmit packet to a Tx FIFO 305, which is a transmit buffer, from the RAM 202 of the main controller 101 via the I/F section 301 and causes the transmit packet to be temporarily stored in the Tx FIFO 305. After that, the MAC 309 transfers the transmit packet from the Tx FIFO 305 to the PHY 310. Thereby, the transmit packet is sent out to the LAN 120.

Next, a packet receiving operation of the LAN I/F 208 in the power-saving state will be described.

The MFP 100 receives a packet from the LAN 120 via the PHY 310. The PHY 310 transfers the receive packet to the MAC 309. The MAC 309 transfers the receive packet to an Rx FIFO 306. The MCU 308 detects that the Rx FIFO 306 has buffered the receive packet, analyzes the receive packet and judges whether performing response while keeping the power-saving state is possible or not. Specifically, it is judged whether performing response while keeping the power-saving state is possible or not by comparing a destination address, a protocol classification and the like obtained by analyzing the header and payload of the receive packet with response enabling patterns held in the RAM 311 in advance, which are not shown. The response enabling patterns are assumed to include, for example, protocols such as ARP (Address Resolution Protocol) and SNMP (Simple Network Management Protocol).

If judging that response to the received packet can be performed while keeping the power-saving state, the MCU 308 generates a response packet corresponding to the receive packet. Specifically, the MCU 308 generates header information and payload information about the response packet on the basis of a result of the analysis of the receive packet and response enabling patterns not shown described above. Then, the MCU 308 transfers the response packet to a Tx FIFO 307. The response packet is transferred from the Tx FIFO 307 to the MAC 309. The MAC 309 transfers the response packet to the PHY 310. The response packet is transmitted to the LAN 120.

On the other hand, if judging that response to the received packet cannot be performed while keeping the power-saving state, the MCU 308 notifies the power supply control section 218 to change the power state to the normal power state. Then, after returning to the normal power state, the main controller 101 performs a response process for the received packet using the main circuit elements including the CPU 201.

Next, description will be made on a link speed setting changing process in which link disconnection accompanying a link speed (communication speed) setting change made at the time of transitioning to the power-saving state when authentication based on IEEE802.1X is enabled does not occur in the MFP 100.

Figure 4:
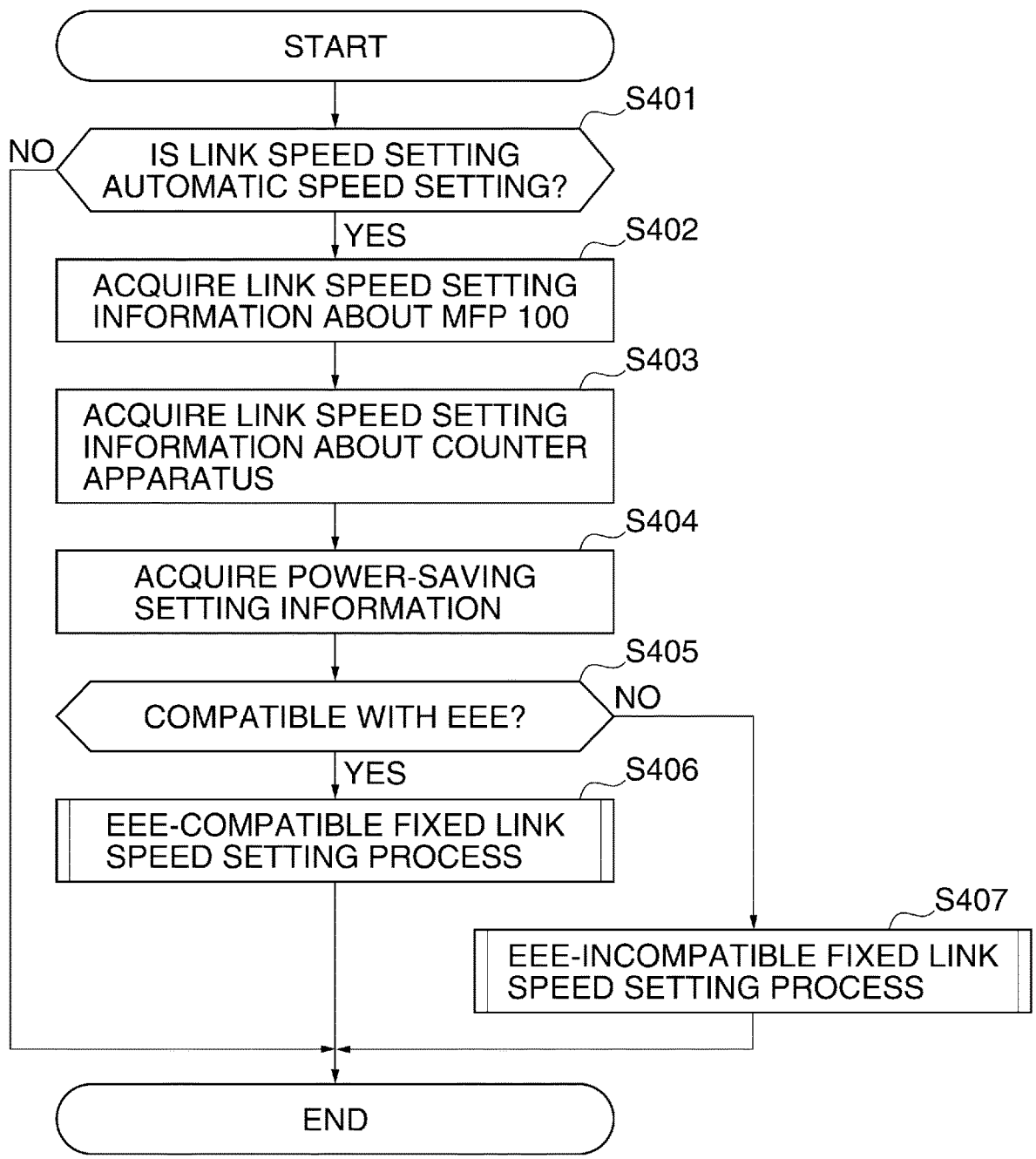
FIG. 4 is a flowchart showing a flow of a link speed setting changing process executed in the MFP.

FIG. 4 is a flowchart showing a flow of the link speed setting changing process executed by the MFP 100. It is assumed that the shown process is started by the MFP 100 detecting an operation of setting for IEEE802.1X authentication displayed by the user performing a predetermined menu operation not shown on the operation section I/F 206 during the normal power state. The process described hereinafter is executed by the CPU 201 on the basis of an operation program developed on the RAM 202.

In step S401, the CPU 201 judges whether the link speed setting of the MFP 100 is automatic speed setting (auto-negotiation) or not. In the present embodiment, when the link speed setting is the automatic speed setting, a link speed setting change occurs at the time of transitioning from the normal power state to the power-saving state.

In step S402, the CPU 201 acquires information about link speed settings with which the MFP 100, which is its own device, is compatible, and link speed for connecting to the LAN 120 via the switch 112 under the automatic speed setting (first acquisition). The link speed setting information and the link speed are assumed to be acquired by referring to link speed information provided for an OS (Operating System) not shown, which constitutes the operation program developed on the RAM 202. The link speed for connection under the automatic speed setting acquired here is the maximum link speed enabling connection between the MFP 100 and the counter-connected switch 112 (hereinafter also referred to as "the counter apparatus"). Details of the link speed setting information will be described later.

Next, in step S403, the CPU 201 acquires link speed setting information about the switch 112 to which the MFP 100 is counter-connected (the first acquisition). This link speed setting information is acquired by the PHY 310 in mutual communication performed in a link establishing process based on the automatic speed setting and held in the REG 303, and the CPU 201 can acquire the link speed setting information by referring to a predetermined register value in the REG 303. Details of the link speed setting information about the communication apparatus will be described later.

Next, in step S404, the CPU 201 acquires power-saving setting information about the MFP 100 (second acquisition). Details of the power-saving setting information will be described later.

In step S405, the CPU 201 judges, on the basis of the acquired pieces of link speed setting information about the MFP 100 and the communication apparatus, whether both apparatuses support the same link speed compatible with EEE (Energy-Efficient Ethernet®) or not. That is, it is judged whether connection can be established with EEE-compatible link speed. If it is judged that connection can be established with the EEE-compatible link speed, the CPU 201 transitions to step S406, where an EEE-compatible fixed link speed setting process is performed. On the other hand, if it is judged that connection with the EEE-compatible link speed cannot be established (incompatible with EEE), the CPU 201 transitions to step S407, where an EEE-incompatible fixed link speed setting process is performed. Detailed processes of steps S406 and S407 will be described later. It should be noted that EEE is a power-saving standard for PHY prescribed in IEEE802.3az.

Figure 5:
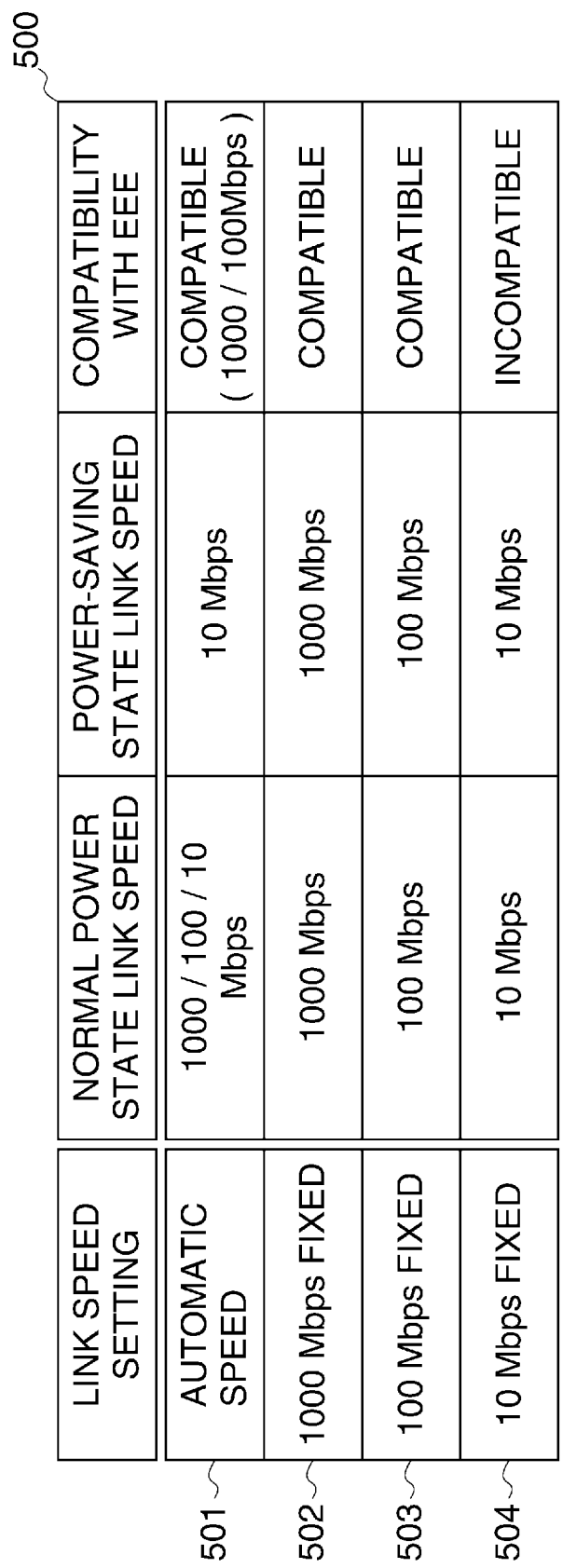
FIG. 5 is a diagram showing an example of link speed setting information about the MFP acquired in step S402 in FIG. 4.

FIG. 5 is a diagram showing an example of the link speed setting information about the MFP 100 acquired in step S402 in FIG. 4.

In FIG. 5, the MFP 100 is provided with automatic speed setting 501, 1000 Mbps fixed speed setting 502, 100 Mbps fixed speed setting 503 and 10 Mbps fixed speed setting 504 as compatible link speed settings. As for each link speed setting, full duplex is provided for 1000 Mbps, and full duplex and half duplex are provided for each of 100 Mbps and 10 Mbps, as communication duplex not shown.

As for the automatic speed setting 501, the link speed in the normal power state is set to any of the maximum 1000 Mbps, 100 Mbps and 10 Mbps. It should be noted that, higher link speed is preferentially set if the higher link speed can be established between the MFP 100 and the communication apparatus.

On the other hand, the link speed setting in the power-saving state is 10 Mbps, and this is the minimum link speed with which the MFP 100 can connect to the communication apparatus. Since, the link speed setting differs between the normal power state and the power-saving state under the automatic speed setting, link disconnection accompanying a link speed setting change occurs when the MFP 100 transitions to the power-saving state.

Under the fixed speed settings (502 to 504), the same link speed is set in both the normal power state and the power-saving state. Even in the case of transitioning from the normal power state to the power-saving state, a link speed setting change does not occur, and link disconnection does not occur. Here, 1000 Mbps and 100 Mbps of the automatic speed setting 501, and 1000 Mbps and 100 Mbps of the fixed speed setting (502 and 503) are compatible with EEE. When connecting to the communication apparatus with a link speed compatible with EEE, EEE can be realized. At this time, the PHY 310 stops unnecessary circuit operations when there is no communication, and power consumption can be reduced thereby.

FIG. 6 is a diagram showing an example of the link speed setting information about the communication apparatus acquired in step S403 in FIG. 4.

In FIG. 6, the switch 112, which is a counter apparatus of the MFP 100, is provided with automatic speed setting 601, 1000 Mbps fixed speed setting 602, 100 Mbps fixed speed setting 603 and 10 Mbps fixed speed setting 604 as compatible link speed settings. The switch 112 is compatible with EEE with each of the link speeds of 1000 Mbps and 100 Mbps under the automatic speed setting and the fixed speed setting.

In the pieces of link speed setting information 500 and 600 about the MFP 100 and the communication apparatus described above, when the link speed setting of the MFP 100 is the automatic speed setting, the link speed setting in the normal power state is 1000 Mbps, and the link speed setting in the power-saving state is 10 Mbps in the present embodiment.

FIG. 7 is a diagram showing an example of the power-saving setting information about the MFP 100 acquired in step S404 in FIG. 4.

The MFP 100 is provided with "high power consumption" 701, which is non-power-saving setting, and "low power consumption" 702, which is power-saving setting as power-saving state information 700. For example, in comparison with "low power consumption" 702, "high power consumption" 701 is setting under which frequency of transitioning from the normal power state to the power-saving state is low, and frequent use of the MFP 100 is prior to power-saving by transition to the power-saving state.

In the present embodiment, it is assumed that power consumption setting for the MFP 100 is set to "low power consumption" 702.

Next, details of each of the processes of step S406 and S407 in FIG. 4 will be described with the use of FIGS. 8 and 9.

Figure 8:
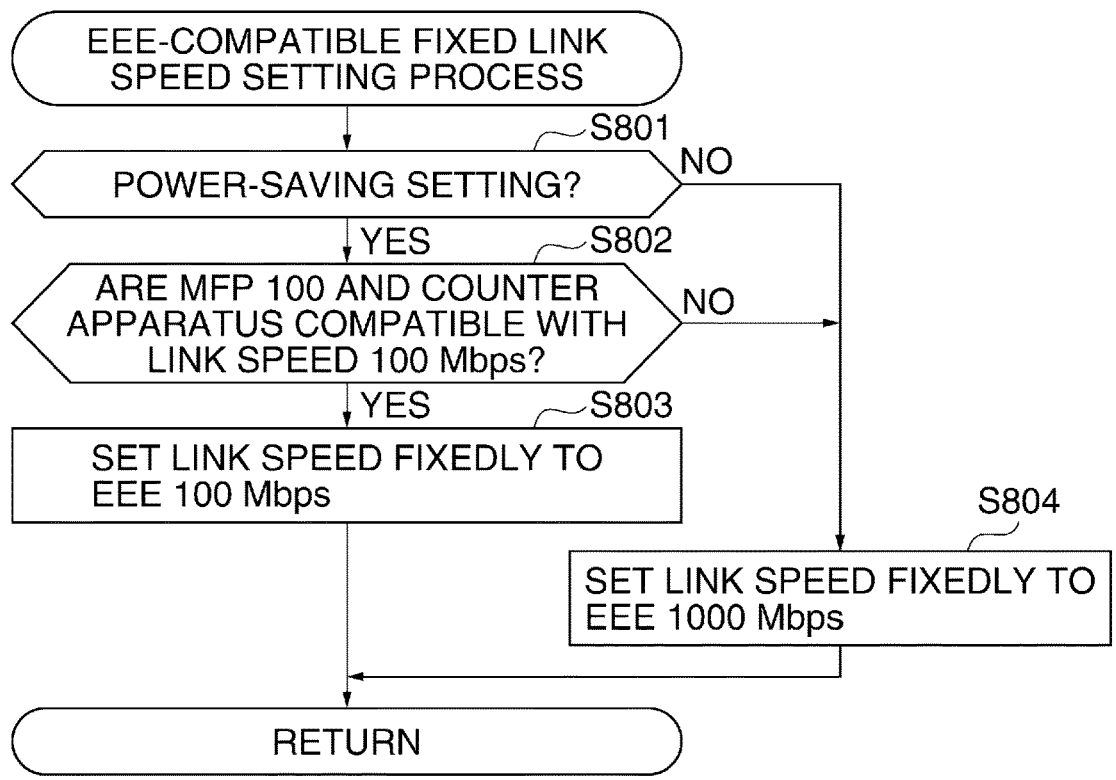
FIG. 8 is a flowchart showing details of an EEE-compatible fixed link speed setting process in step S406 in FIG. 4.

FIG. 8 is a flowchart showing the details of the EEE-compatible fixed link speed setting process in step S406 in FIG. 4.

In step S801, the CPU 201 judges whether the MFP 100 is under the power-saving setting (whether the state of "low power consumption" 702 is set) or not on the basis of the power-saving state information 700 acquired in step S404 in FIG. 4. If judging that the MFP 100 is under the power-saving setting, the CPU 201 transitions to step S802. On the other hand, if judging that the MFP 100 is not under the power-saving setting, the CPU 201 transitions to step S804.

In step S802, the CPU 201 judges whether or not the MFP 100 and the counter apparatus are compatible with 100 Mbps lower than the maximum link speed 1000 Mbps enabling connection in the normal power state. This is performed on the basis of the pieces of link speed setting information 500 and 600 about the MFP 100 and the communication apparatus acquired in steps S402 and S403 in FIG. 4. If it is judged in step S802 that the MFP 100 and the counter apparatus are compatible with 100 Mbps, the CPU 201 transitions to step S803. On the other hand, if otherwise judged, the CPU 201 transitions to step S804.

In step S803, the CPU 201 sets the link speed of the MFP 100 to 100 Mbps fixed and to EEE-enabled, and the process returns (communication control).

In step S804, the CPU 201 sets the link speed of the MFP 100 to 1000 Mbps fixed and to EEE-enabled, and the process returns (communication control).

It should be noted that, as the link speed set in step S803, link speed which is low enough not to affect the processing of the MFP 100 is desirable. In the present embodiment, the link speed is set not to 10 Mbps which affects printing processing speed but to 100 Mbps.

Figure 9:
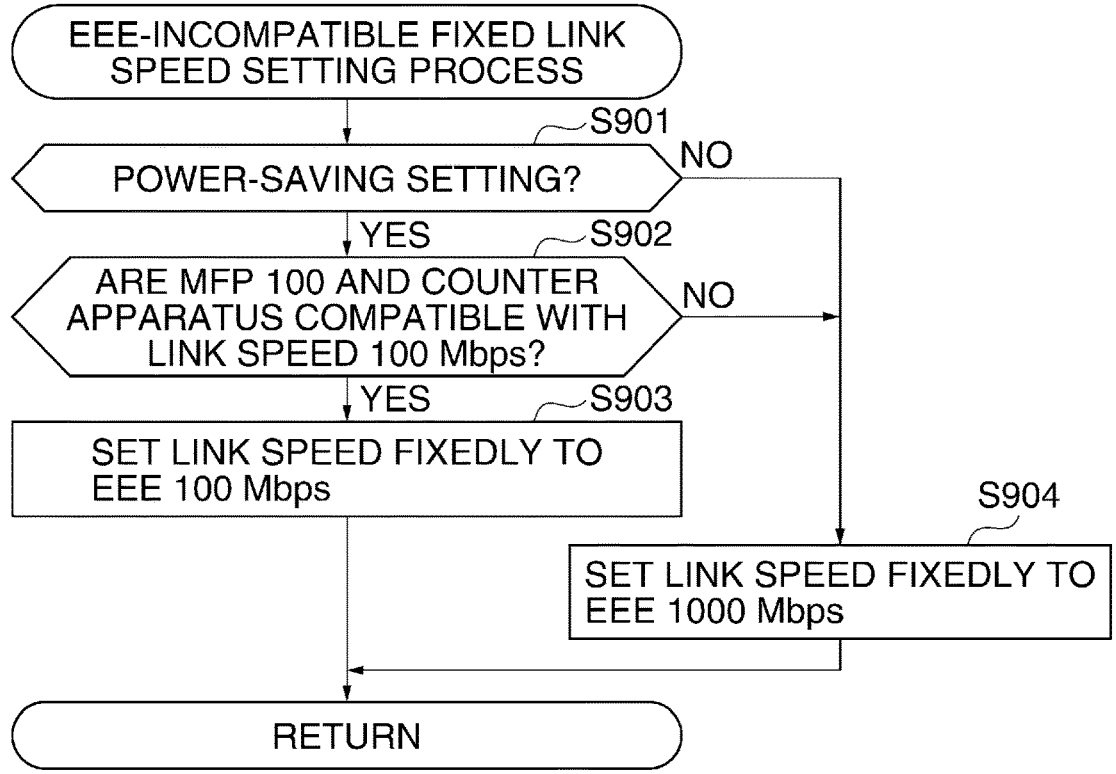
FIG. 9 is a flowchart showing details of an EEE-incompatible fixed link speed setting process in step S407 in FIG. 4.

FIG. 9 is a flowchart showing details of the EEE-incompatible fixed link speed setting process in step S407 in FIG. 4.

In step S901, the CPU 201 judges whether the MFP 100 is under the power-saving setting or not on the basis of the power-saving state information 700 acquired in step S404 in FIG. 4. If judging that the MFP 100 is under the power-saving setting, the CPU 201 transitions to step S902. On the other hand, if judging that the MFP 100 is not under the power-saving setting, the CPU 201 transitions to step S904.

In step S902, the CPU 201 judges whether or not the MFP 100 and the counter apparatus are compatible with 100 Mbps lower than the maximum link speed 1000 Mbps enabling connection in the normal power state. This is performed on the basis of the pieces of link speed setting information 500 and 600 about the MFP 100 and the communication apparatus acquired in step S402 and S403 in FIG. 4. If it is judged in step S902 that the MFP 100 and the counter apparatus are compatible with 100 Mbps, the CPU 201 transitions to step S903. On the other hand, if otherwise judged, the CPU 201 transitions to step S904.

In step S903, the CPU 201 sets the link speed of the MFP 100 to 100 Mbps fixed, and the process returns (communication control).

In step S904, the CPU 201 sets the link speed of the MFP 100 to 1000 Mbps fixed, and the process returns (communication control).

It should be noted that, as the link speed set in step S903, link speed which is low enough not to affect the processing of the MFP 100 is desirable. In the present embodiment, the link speed is set not to 10 Mbps which affects printing processing speed but to 100 Mbps.

In the present embodiment, both of the MFP 100 and the switch 112, which is a counter apparatus, are compatible with the link speed 100 Mbps and EEE, and the power-saving setting of the MFP 100 is "low power consumption" 702. That is, judgment results of step S405 in FIG. 4 and step S802 in FIG. 8 are "YES", and the 100 Mbps fixed link speed compatible with EEE can be set.

The link speed setting changing process described above may be configured so as to be confirmed by a predetermined menu operation on the operation section 102 of the MFP 100.

FIG. 10A is a diagram showing an example of a link speed setting changing screen displayed on a liquid crystal touch panel not shown, which is provided on the operation section 102. It is assumed that this screen is displayed by the user performing a predetermined menu operation on the operation section 102 when the MFP 100 is in the normal power state.

In FIG. 10A, a link speed setting changing screen 1000 is an example of a confirmation screen displayed when link speed setting is to be changed after authentication is enabled in an IEEE802.1X authentication setting menu operation. In the present embodiment, it is notified by a pop-up display 1010 to the effect that the link speed setting before change is to be changed from the automatic setting to the EEE-compatible 100 Mbps fixed setting by the link speed setting changing process described above. At this time, the user can press down a button 1011 to confirm the setting.

The link speed (network speed) setting changing notification on the link speed setting changing screen 1000 may be given by a pop-up display 1020 for causing the user to make the change as shown in FIG. 10B. At this time, the link speed setting is changed to the EEE-compatible 100 Mbps by pressing down a button 1021, while the link speed setting is prevented from being changed, by pressing down a button 1022. In the case of preventing the link speed setting from being changed, by pressing down the button 1022, a user notification to the effect that the power-saving setting of the MFP 100 is released not to transition to the power-saving state or to the effect that IEEE802.1X authentication is disabled, which is not shown, may be made or a setting change may be made after that.

The link speed setting changing notification on the link speed setting changing screen 1000 may be given by a pop-up display 1030 displaying a list of link speeds to which the setting can be changed and causing the user to make the change as shown in FIG. 10C. On the list of link speeds, a plurality of link speeds and EEE settings with which both the MFP 100 and the communication apparatus are compatible and with which fixed connection can be established are displayed on the basis of the pieces of link speed setting information 500 and 600 about the MFP 100 and the communication apparatus acquired in steps S402 and S403 in FIG. 4. In the shown example, four choices are displayed: 1000 Mbps (1000 M-EEE) and 100 Mbps (100 M-EEE) compatible with EEE, and 1000 Mbps (1000 M) and 100 Mbps (100 M) incompatible with EEE. The user selects one link speed from among displayed selectable link speed settings. In the shown example, the EEE-compatible 100 Mbps fixed link speed setting is set.

A screen display related to the link speed setting change described above may be configured to be shown at the time of changing the link speed setting.

Figure 11A:
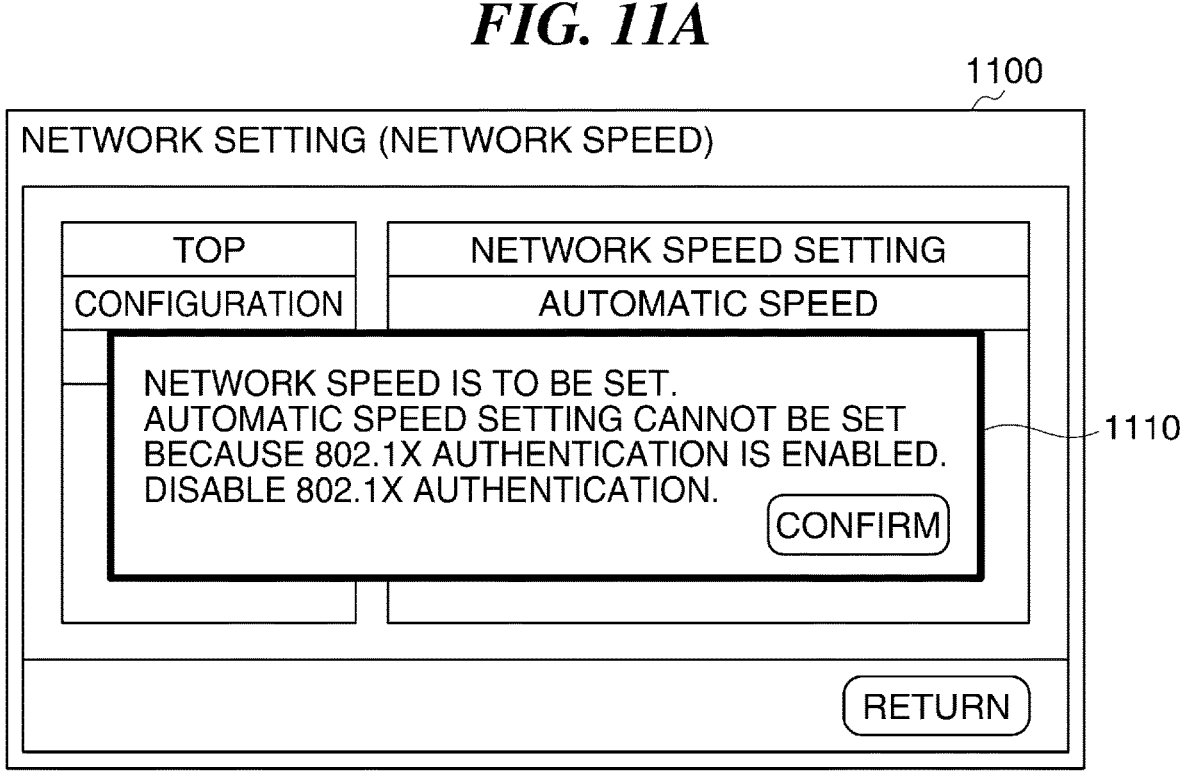
FIG. 11A is a diagram showing an example of a link speed setting screen displayed on the operation section.

FIG. 11A is a diagram showing an example of a link speed setting changing screen displayed on a liquid crystal touch panel not shown, which is provided on the operation section 102. This screen is displayed by the user performing a predetermined menu operation on the operation section 102.

Figure 11B:
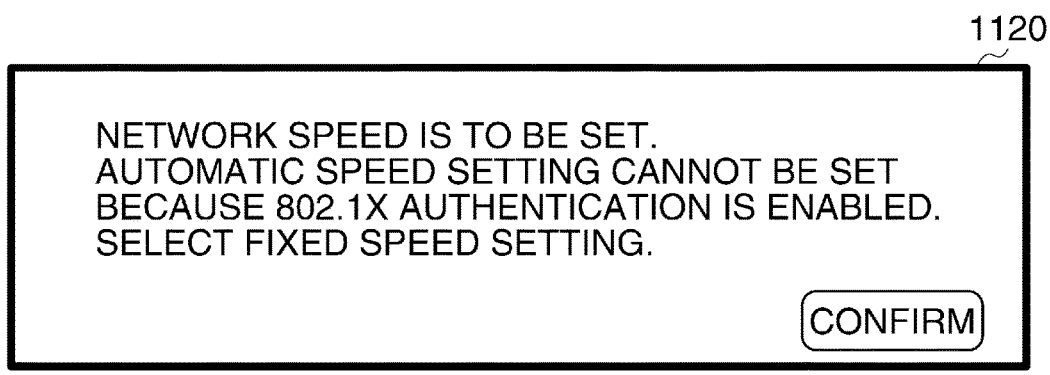
FIG. 11B is a diagram showing an example of a pop-up display indicating that automatic speed setting is impossible in link speed setting on the link speed setting screen.

In FIG. 11A, a screen 1100 is an example of a confirmation screen displayed according to a state of setting of IEEE802.1X authentication after speed is set, in a link speed setting menu operation. Consideration will be made, for example, on a case of, after enabling IEEE802.1X authentication and setting the link speed to EEE 100 Mbps by a setting operation on the link speed setting changing screen 1000 shown in FIG. 10A in advance, changing the link speed setting to the automatic speed. In this case, for example, a pop-up display 1110 is shown to the effect that the automatic speed setting is impossible because IEEE802.1X authentication is enabled. Thereby, it is possible to prevent it from happening that an IEEE802.1X re-authentication process is required (that is, transition to the normal power state is required) because the user has carelessly changed the link speed and to avoid a situation that it is impossible to transition to the power-saving state when IEEE802.1X authentication is enabled. The pop-up display 1110 may be changed to a pop-up display 1120 shown in FIG. 11B, which is configured to prompt the user to set fixed speed setting when the automatic speed setting is not possible because IEEE802.1X authentication is enabled.

As described above, on the basis of the acquired pieces of link speed setting information about the MFP 100 and the communication apparatus, the MFP 100 can set fixed link speed with which both the MFP 100 and the communication apparatus are compatible.

Furthermore, on the basis of the acquired power-saving setting information about the MFP 100, the MFP 100 can set fixed link speed in which 100 Mbps lower than 1000 Mbps is set and EEE is enabled with lower power consumption when the power-saving setting is effective. By performing this setting process at the time of setting IEEE802.1X authentication, the fixed link speed setting can be effective after that. As a result, even when IEEE802.1X authentication is enabled, the re-authentication process (that is, transition to the normal power state) caused by link disconnection accompanying a link speed change made at the time of transitioning to the power-saving state can be avoided, and both of security and power-saving can be realized.

In the link speed setting changing processes shown in FIGS. 4, 8 and 9, the fixed link speed to be set for the MFP 100 is not limited to 1000 Mbps and 100 Mbps. Other speeds are also possible. For example, a case can be considered where the pieces of link speed setting information about the MFP 100 and the communication apparatus acquired in steps S402 and S403 show setting EEE-compatible 10 G (Giga) bps faster than 1000 Mbps. It should be noted that, if it is judged in step S801 that the power-saving state is set for the MFP 100, link speed lower than 10 Gbps with which the MFP 100 and the communication apparatus are compatible may be set in step S802, and the 1000 Mbps or 100 Mbps fixed link speed may be set in step S803.

The power-saving setting for the MFP 100 shown in FIG. 7 is not limited to the two states. Link speed changing control may be performed according to at least three power-saving states. For example, if three states of "high power consumption", "common power consumption" and "low power consumption" are possible as power-saving settings for the MFP 100, the high power consumption setting and the other settings may be judged as non-power-saving setting and power-saving settings, respectively. That is, if the power-saving setting is "low power consumption" or "common power consumption", it is judged in steps S801 and S901 that power-saving setting is set for the MFP 100, and connection with lower fixed link speed may be tried to be established at subsequent steps.

The process flow related to link speed changing control shown in FIG. 4 may be executed at the time of such a setting operation that makes it difficult for the MFP 100 to transition to the power-saving state when the link speed setting is the automatic speed setting, in addition to the time of an operation of setting IEEE802.1X authentication. As such a process, there is, for example, an IP (Internet Protocol) FAX operation performed on an NGN (Next Generation Network). In the IP-FAX operation on the NGN, the MFP 100 is required to respond to a counter gateway within a predetermined time after detecting an incoming call.

Figure 12:
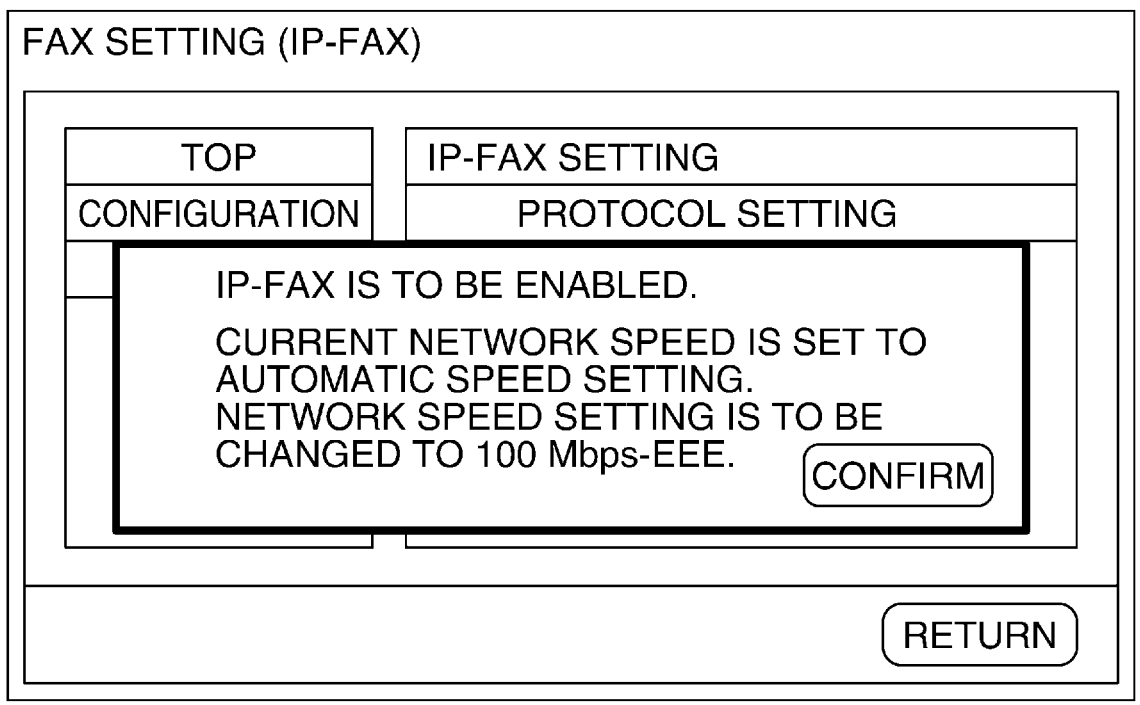
FIG. 12 is a diagram showing an example of the link speed setting screen when IP-FAX setting is enabled, which is displayed on the operation section.

However, when the link speed setting is the automatic speed setting, link disconnection accompanying a link speed setting change occurs at the time of transitioning from the power-saving state to the normal power state, and then the MFP 100 cannot perform a response process until reconnection is established. Therefore, there is a possibility of timeout. Thus, by setting the link speed setting to fixed link speed setting when the IP-FAX setting is enabled, similarly to the time of the IEEE802.1X authentication setting operation, it is possible to immediately return from the power-saving state without link disconnection accompanying a link speed setting change and respond to the counter gateway (communication apparatus) without occurrence of timeout. In this case, such a configuration is also possible that a link speed setting change made when the IP-FAX setting is enabled can be confirmed on the operation section 102. For example, a screen 1200 shown in FIG. 12 makes a notification to the effect that the link speed setting before change is to be changed from the automatic setting to the EEE-compatible 100 Mbps fixed speed setting by the pop-up display 1010. It should be noted that the screen notification is not limited thereto. By appropriately displaying the link speed setting changing screen 1000 at the time of setting IEEE802.1X authentication described above and the pop-up displays 1010 to 1030, the user can set the MFP 100 to fixed link speed setting more interactively.

According to the above embodiment, if setting of the link speed between the MFP 100 and the switch 112 (communication apparatus) is the automatic speed setting when communication based on IEEE802.1X authentication is enabled, the setting is changed to fixed link speed with which network connection with the communication apparatus is not cut off at the time of transitioning to the power-saving state. Specifically, on the basis of acquired pieces of link speed setting information about the MFP 100 and the communication apparatus (switch 112), fixed link speed with which both the MFP 100 and the communication apparatuses are compatible is set. Then, on the basis of acquired power-saving setting information about the MFP 100, 100 Mbps lower than 1000 Mbps is fixedly set when the power-saving setting is effective, and EEE is enabled. Thus, setting with much lower power consumption can be made. By performing this setting process at the time of setting IEEE802.1X authentication, the fixed link speed setting can be effective after that. As a result, even when IEEE802.1X authentication is enabled, the re-authentication process (that is, transition to the normal power state) caused by link disconnection accompanying a link speed change made at the time of transitioning to the power-saving state can be avoided, and both of security and power-saving can be realized.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-234847, filed Nov. 13, 2013, which is hereby incorporated by reference herein in its entirety.

What is claimed is:

1. An information processing apparatus that performs a predetermined authentication function by communicating with an authentication server via an authenticator at a time of link connection between the information processing apparatus and the authenticator, the information processing apparatus comprising:
   a memory; and
   a processor that executes a program stored in the memory to:
      detect an operation to enable the predetermined authentication function; and
      change, when the operation to enable the predetermined authentication function is detected and an automatic speed setting is set, a setting of the information processing apparatus from the automatic speed setting, where a communication speed between the information processing apparatus and the authenticator is changed to a lower communication speed from a higher communication speed through link disconnection and reconnection between the information processing apparatus and the authenticator when the information processing apparatus transitions to a power saving state from a normal power state, to a fixed speed setting, where the communication speed between the information processing apparatus and the authenticator is not changed from a fixed communication speed and the link disconnection and reconnection between the information processing apparatus and the authenticator does not occur when the information processing apparatus transitions to the power saving state from the normal power state,
   wherein the higher communication speed is at least 1000 Mbps,
   wherein the fixed communication speed is at least 1000 Mbps in a case where the information processing apparatus is under a first power consumption setting,
   wherein the fixed communication speed is less than 1000 Mbps in a case where the information processing apparatus is under a second power consumption setting, and
   wherein the second power consumption setting is a setting for saving power consumption compared to the first power consumption setting.

2. The information processing apparatus according to claim 1, wherein the information processing apparatus is a printing apparatus.

3. A method that controls an information processing apparatus having that performs a predetermined authentication function by communicating with an authentication server via an authenticator at a time of link connection between the information processing apparatus and the authenticator, the method comprising:
   detecting an operation to enable the predetermined authentication function; and
   changing, when the operation to enable the predetermined authentication function is detected and an automatic speed setting is set, a setting of the information processing apparatus from the automatic speed setting, where a communication speed between the information processing apparatus and the authenticator is changed to a lower communication speed from a higher communication speed through link disconnection and reconnection between the information processing apparatus and the authenticator when the information processing apparatus transitions to a power saving state from a normal power state, to a fixed speed setting where the communication speed between the information processing apparatus and the authenticator is not changed from a fixed communication speed and the link disconnection and reconnection between the information processing apparatus and the authenticator does not occur when the information processing apparatus transitions to the power saving state from the normal power state,
   wherein the higher communication speed is at least 1000 Mbps,
   wherein the fixed communication speed is at least 1000 Mbps in a case where the information processing apparatus is under a first power consumption setting,
   wherein the fixed communication speed is less than 1000 Mbps in a case where the information processing apparatus is under a second power consumption setting, and
   wherein the second power consumption setting is a setting for saving power consumption compared to the first power consumption setting.

4. The information processing apparatus according to claim 1, wherein the predetermined authentication function is an authentication function based on IEEE802.1X.

5. The information processing apparatus according to claim 1, further comprising a network interface that communicates with the authenticator,
   wherein the processor and the network interface are powered when the information processing apparatus is in the normal power state, and
   wherein the processor is not powered and the network interface is powered when the information processing apparatus is in the power saving state.

* * * * *